May 6, 1952      D. O. WENDT      2,595,432
BULL LEAD WITH QUICK RELEASE
Filed Feb. 28, 1949
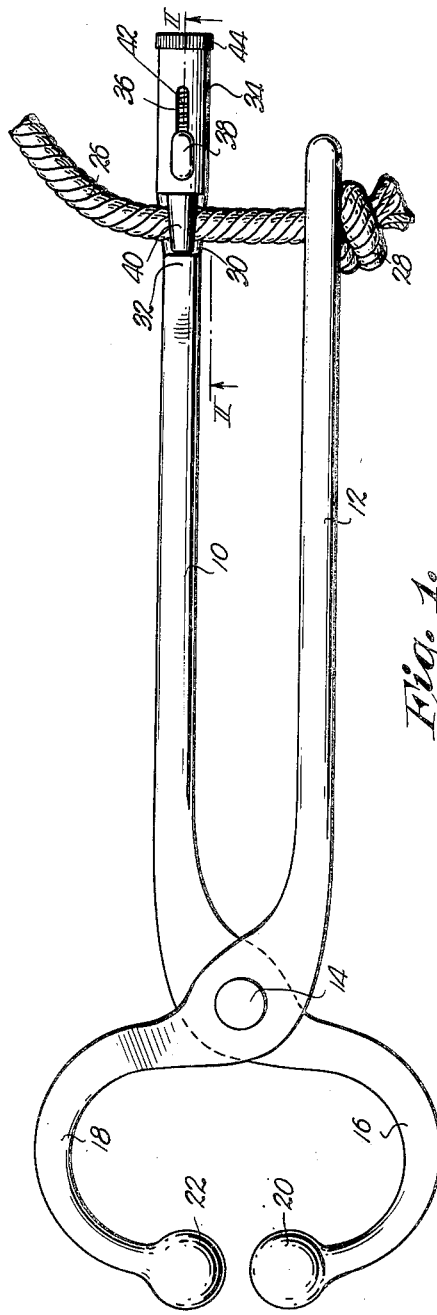
INVENTOR.
Delbert O. Wendt
BY Patented May 6, 1952

2,595,432

UNITED STATES PATENT OFFICE 2,595,432

BULL LEAD WITH QUICK RELEASE

Delbert O. Wendt, Bonner Springs, Kans.

Application February 28, 1949, Serial No. 78,790

1 Claim. (Cl. 119—154)

This invention relates to a plier-like tool or device usable as an animal lead commonly employed for engagement with the nose septum of bulls and other animals, the primary object being to provide a quick release mechanism for holding the jaws of the tool in gripping operation, all to the end that the operator may easily disengage the jaws irrespective of whether or not the animal is causing such releasing operation otherwise difficult.

It is the most important object of the present invention to provide a bull lead having a pair of operating handles and a rope for joining the handles and holding the same against separation when the tool is placed in use, there being a quick release means on one of the handles in the form of a recess for receiving the rope and a gate movable to and from a position confining the rope within the recess.

Another important object of the present invention is to provide in a bull lead of the above mentioned character, a gate and recess means on one of the handles for receiving the rope so formed as to grip the rope and prevent slippage thereof within the recess when the rope is moved to one end of the recess.

Other objects of the present invention relate to the way in which means is provided for yieldably holding the gate in the closed position; the way in which an easily accessible finger piece is provided on the gate for operating the same; and other more minor details of construction, all of which will be made clear or become apparent as the following specification progresses.

In the drawing:

Fig. 1 is a side elevational view of a bull lead with quick release made in accordance with my present invention.

Fig. 2 is a fragmentary cross-sectional view taken on irregular line II—II of Fig. 1; and Fig. 3 is a fragmentary side elevational view similar to Fig. 1, showing the gate of one of the handles in the released position.

It is well known that the conventional type of bull lead is provided with a pair of operating handles movable toward and from each other, together with a rope that has one end thereof secured to one of the handles with the rope passing through an opening formed in the other handle.

The gripping portion of the lead is held in an operative condition with respect to the nose of the animal by holding the rope in a taut condition which in turn, forces the handles toward each other because of the sliding relationship between the perforated handle and the rope. Releasing of such conventional lead is difficult because of the fact that the handles cannot be separated when the animal is exerting a pull against the rope in an attempt to release the lead.

In the improved bull lead forming the subject matter of this invention, there is provided a pair of elongated operating handles 10 and 12, disposed in crossed relationship intermediate the ends thereof. Handles 10 and 12 are pivotally interconnected at their point of crossing through use of a pin 14 and one end of each handle terminates in a semi-circular jaw 16 and 18 respectively. Each jaw 16 and 18 is in turn provided on the free end thereof with a spherical head 20 and 22 respectively in the usual manner.

Heads 20 and 22 are adapted to enter the nostrils of an animal and as handles 10 and 12 are manipulated for relative movement toward each other, heads 20 and 22 will in turn move together and grip the septum of the animal's nose.

A hole 24 is formed in the handle 12 near the free end thereof through which passes a rope or like flexible member 26 having one end thereof provided with a knot 28 to limit movement of rope 26 in one direction with respect to handle 12.

Handle 10 is provided with an open top recess 30 near the free end thereof adapted to receive the rope 26 as illustrated in the drawing.

An over-hanging lip 32 closes a portion of the top of recess 30 and a tubular extension 34 forms the free end of handle 10 and is disposed in coaxial alignment with the free end of the over-hanging lip 32. Tubular member 34 is provided with an elongated slot 36 wherein is slidably disposed a finger piece 38 that connects directly with a gate 40. Gate 40 is freely slidable within the tubular member 34 and is held biased toward one end of its path of travel through the medium of a coil spring 42 within tubular member 34.

One end of spring 42 bears directly against the gate 40 while the opposite end thereof is engaged by a plug 44 that closes the outermost end of the tubular member 34 and as illustrated in Fig. 2 of the drawing, the plug 44 and the tubular member 34 are provided with inter-meshing threads for the removable mounting of plug 44.

Spring 42 normally holds a portion of the gate 40 in closed relationship with respect to the recess 30. The outermost free end of gate 40 abuts proximal free end of over-hanging lip 32 when gate 40 is in the closed position.

As illustrated in Figs. 1 and 2 of the drawing, when rope 26 is within the confines of recess 30, and when the gate 40 is in the closed position, rope 26 is held against removal from handle 10. That portion of the gate 40 that is disposed exteriorly of the confines of tubular member 34 when gate 40 is in the closed position illustrated in Figs. 1 and 2, is frusto-conical or tapered with the smaller radius thereof disposed adjacent the outermost free end of gate 40. The width of the recess 30 next adjacent the overhanging lip 32 and the distance between the outermost free end of gate 40 and the opposite face of recess 30, are greater than the diameter of rope 26 to the end that when rope 26 is positioned adjacent lip 32, handle 10 may be swung outwardly or inwardly with respect to handle 12 as rope 26 slides within recess 30. However, the width of the recess 30 adjacent the proximal end of tubular extension 34, is slightly less than the diameter of rope 26, all to the end that when rope 26 is in the position illustrated in Fig. 2 of the drawing, gate 40 and the walls of recess 30, will cooperate in gripping rope 26 and preventing relative slippage between handle 10 and rope 26.

When the lead is placed in use, rope 26 is positioned within the recess 30 to permit relative swinging movement of handles 10 and 12 away from each other for separating the heads 20 and 22 of jaws 16 and 18 respectively. The operator grasping handles 10 and 12, applies the heads 20 and 22 to the animal's nose, manipulates handles 10 and 12 to move heads 20 and 22 into gripping relationship with the animal's nose and thereupon, slides rope 26 within the recess 30 to a point where gate 40 grips the same and prevents slippage of rope 26 within recess 30. As the rope 26 is held taut at an angle with respect to handles 10 and 12 as illustrated in Figs. 1 and 3, or extending directly outwardly in a plane parallel with the longitudinal axis of handle 10, the gripping engagement between rope 26 and the gate 40 will progressively increase.

To release the lead, the operator simply grasps the tubular extension 34 of handle 10 and with one finger, moves finger piece 38 to open gate 40 in the manner illustrated in Fig. 3. Rope 26 thereupon can be removed entirely from within the confines of recess 30 and handles 10 and 12 will automatically separate and release the spherical heads 20 and 22 from the nose of the animal.

It is apparent from the foregoing, that through use of a bull lead made in accordance with the present invention, the hazards and difficulties heretofore present in applying and releasing tools of this character, are entirely eliminated. As the animal attempts to release himself from the grip of the lead, the operator can quickly and easily manipulate the recess, closing the gate, and thereby free the lead rope from one of the handles which in turn causes the entire tool to fall from the operative position gripping the animal's nose.

Manifestly, the device is subject to many changes and modifications and those that fairly come within the scope of the appended claim, are contemplated hereby.

Having thus described the invention, what is claimed as new and desired to be secured by Letters Patent is:

In a device having a pair of elongated handles pivotally interconnected for swinging movement toward and away from each other, quickly releasable structure for holding the handles against movement away from each other, said structure comprising a snap hook on one end of one of said handles and including an open top recess formed in said one handle, a lip on the one handle, a tube integral with the one handle and spaced from said lip, a gate reciprocable in the tube on the longitudinal axis of the one handle and having a portion normally closing the recess, a spring in the tube for yieldably holding the gate closed; a rope, the other of said handles having a hole therein, said rope passing through the hole and the recess and having a knot normally bearing against said other handle, said portion of the gate being frusto-conical and having the apex end thereof normally bearing against said lip whereby, as the rope is pulled to move the handles toward each other, it is wedged progressively tighter in the recess against said portion of the gate adjacent the base end of said portion; and a finger-piece on the gate for moving the latter against the action of said spring to an open position for releasing the rope from the recess and thereby releasing the handles.

DELBERT O. WENDT.

REFERENCES CITED

The following references are of record in the file of this patent:

UNITED STATES PATENTS

| Number | Name | Date |
| --- | --- | --- |
| 191,575 | Eames | June 5, 1877 |
| 536,456 | Chapman | Mar. 26, 1895 |
| 1,250,596 | Kuhns | Dec. 18, 1917 |
| 1,344,828 | Simantel | June 29, 1920 |
| 2,052,371 | Tyler | Aug. 25, 1936 |